Patented Mar. 25, 1924.

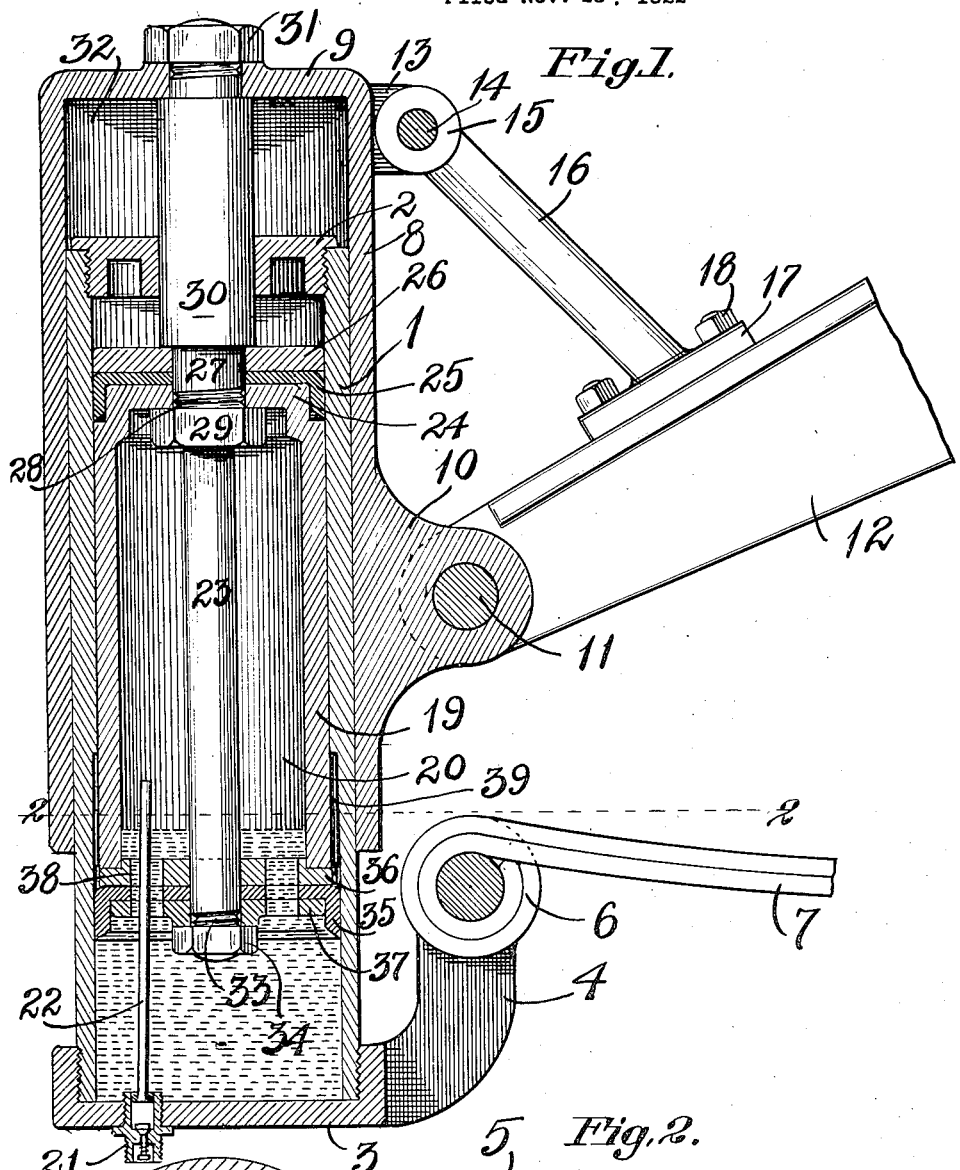
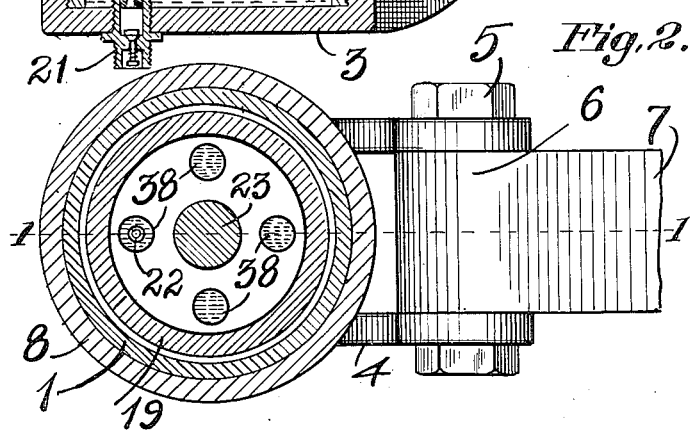

1,487,777

UNITED STATES PATENT OFFICE.

ROLAND M. GRUSS, OF SAN FRANCISCO, CALIFORNIA.

SHOCK ABSORBER.

Application filed November 23, 1922. Serial No. 602,870.

*To all whom it may concern:*

Be it known that I, ROLAND M. GRUSS, a citizen of the United States, and a resident of the city of San Francisco, county of San Francisco, State of California, have invented a new and useful Shock Absorber, of which the following is a specification.

The present invention relates in general to a so-called shock absorber as used in combination with the spring suspension of motor, and other vehicles, for relieving the wear and tear on the spring suspension and other parts of the vehicle structure as well as relieving the occupants of the effects of unpleasant jolts and other shocks when the vehicle traverses rough and uneven road surfaces.

Since there are several different types of shock absorbers used at the present time I will more particularly identify the device which I have in mind as an air spring. In other words, I have proposed to use an air cushion realized from employing a head of air within a cylinder as the primary cushioning means. In the conventional type of these so-called air springs it has been a common practice to use oil or other like mediums in combination with the air cushion, and with the oil in many instances acting as a secondary cushioning means. In most of the well-known types the air cushion has been incorporated in the upper part of the device and with the oil also located in the upper part. Experience has shown that there are many disadvantages in confining the oil in the upper part of the cylinder. One of these outstanding disadvantages is leakage due to the fact that it is practically impossible to properly confine the oil within the upper part of the cylinder due to the intermittent pressure which is imposed on the same, tending to force it by washers and other sealing means which are not properly set, or even if worn will permit the oil to seek a lower level in the cylinder of the device which will result in leakage and otherwise interfere with the proper function of the movable parts.

To overcome the above noted disadvantages and at the same time having other objects in view, I propose to confine the oil or other like medium, as the case may be, in the lower part of the cylinder, and to take proper measures to prevent leakage to the outside of the cylinder.

The preferred construction of my improved device is illustrated in the accompanying drawing in which Figure 1 is a vertical section on the line 1—1 of Figure 2, and Figure 2 is a cross section on the line 2—2 of Figure 1.

Referring now to the drawing in detail (1) represents the cylinder of the device which is preferably made as an elongated sleeve member having a cap (2) threaded into the top thereof to close the opening therein, and with its bottom closed by a combination cap and bracket (3) which is threaded to the outside of the cylinder and embodies in its construction an upstanding, bifurcated bracket part (4), the ends of which terminating in eyes through which the bolt or the like (5) is used to engage the eye (6) of the spring structure (7) which in turn as is customary is mounted to the axle housing or other part of the vehicle.

Telescoping with the cylinder (1) is an outer casing (8) which is made to snugly fit around the cylinder as a jacket, the fit between the jacket and the cylinder being such as to permit reciprocating movement of the cylinder within the jacket. The top of the jacket (9) is closed and a bifurcated extension (10) is provided on the side of the jacket to leave attaching ears through which a bolt or the like (11) is passed so as to engage the eye in the frame member (12) of the vehicle body. In incorporating the device in the spring suspension, instead of connecting the spring (7) by a shackle or the like to the frame member (12) of the body, the shackle is dispensed with and the device connected as just described. To properly brace the jacket as well as the entire device, I suggest providing a bifurcated extension (13) adjacent the top of the jacket, and to use a bolt (14) through the eyes of the extension with the same passing through the eye (15) of the rod (16) and with the opposite end of the rod rigidly fixed by a base plate (17) and bolts (18) to the plane surface on top of the frame member (12). The connection realized by the bifurcated extension (13) with the bolt (14) and the eye (15) of the bracket (16) leaves the jacket (8) free to reciprocate without being retarded by the brace.

The cylinder (1) is made with a reduced diameter for a part of the length of the internal bore thereof, and an enlarged diameter for the remaining part of the length of the bore. Mounted for reciprocation within the cylinder (1) is a piston (19), the same having a diameter to fit within the reduced diameter of the cylinder bore. The piston is made with a hollow as at (20) and the skirt of the same is relatively long. Air is adapted to be introduced and confined within the hollow of the piston through the valve connection (21) in the bottom of the closure (3) and with this valve connection including an attached communicating pipe or tube (22) which extends into the hollow (20) so that air may be pumped into the same for maintaining the desired pressure. The piston (19) is made with a rod (23) which extends through an opening in the closed top (24) and the top is made with an annular upstanding flange to receive a cup washer (25), the ends of which being turned downwardly into the space between the flange and the walls of the cylinder, and a disc (26) overlies the cup washer to hold it in place. The rod (23) is made with an enlarged diameter as at (27) and with the end of the enlargement threaded as at (28) to receive a nut (29) in the hollow of the piston so that the still greater enlargement (30) of the rod may be used in combination with the nut for clamping the disc (26) and the cup washer (25) on top of the piston. The enlarged part (30) of the rod extends through an opening in the cap (2) and through the top (9) of the jacket (8) where the threaded end thereof is engaged by a suitable nut (31). A space (32) is left between the top of the piston and the top (9) of the jacket. The lower end of the rod (23) is threaded as at (33) to receive a nut (34) so as to confine the cup washer (35) between the discs (36) and (37). The discs (36) and (37) as well as the cup washer are perforated as at (38) so as to leave restricted communicating passages between the hollow (20) of the piston (19) and the bottom part of the cylinder. The diameter of the disc (36) is equal to that of the piston but the diameter of the cup washer (35), after the perimeter of the same is turned down as shown, is substantially that of the diameter of the enlarged diameter of the cylinder, which leaves a closed space (39) between the walls of the piston and the walls of the cylinder. The tube (22) for introducing a head of air within the hollow of the piston extends through one of the restricted passages (38).

*Operation.*

Considering that the normal position of the parts shown and described are substantially as shown in Figure 1 in the drawing, when the vehicle to which the device is applied encounters a rough road surface, such for instance as a bump, and the frame member (12) and the spring (7) move apart, that is to say, the resiliency of the spring tends to shove the body away from the wheels as the vehicle rides over the bump, the connection between the spring (7) and the cylinder will tend to pull the cylinder down and the connection between the piston and the frame member (12) will tend to pull the piston up. To check or absorb the rebound of the spring a head of air is maintained in the hollow (20) of the piston and the same is sealed therein by a quantity of oil in the lower part of the cylinder, and with the level of the same extending into the hollow of the piston slightly above the restricted passages therein, or rather slightly above the end of the piston skirt. As the piston goes up there is a slight checking effect realized by the air in the space in the cylinder above the piston and the air in the space within the jacket above the cylinder, but the air in these spaces may be maintained at atmospheric pressure so that there is practically no decided cushioning effect realized. However, on the rebound the tight fit between the cup washer (35) and the enlarged diameter of the cylinder will tend to force the oil through the restricted passages (38) into the hollow of the piston against the head of air that is maintained therein, and thus a decided cushioning effect is realized. In some instances the rebound action will be so severe as to compress the head of air in the hollow of the cylinder to the utmost, thus leaving a tendency for the oil to go somewhere else except through the restricted passages (38). To prevent the same from being forced up between the outer walls of the piston and the inner walls of the cylinder, I propose to utilize the space (39) so that should any oil be forced in this direction it will be trapped in this space (39); and as the piston goes up in the cylinder, when the vehicle encounters another rough surface or bump the space (39) will be decreased, which will pump the oil trapped therein back into the lower part of the cylinder. The cup washer on the top of the piston will act as an extra safeguard should any oil pass the space (39) and reach the top of the piston.

I claim:

1. In a shock absorber, a cylinder, the internal bore of the cylinder having a diameter for a part of its length greater than that of other parts of its length, a hollow reciprocating piston fitted within the reduced diameter of the cylinder bore to leave a space between the same and the enlarged diameter of the cylinder bore, a head of air within the hollow of the piston, a perforated closure for the bottom of the piston having a diameter of substantially that of the enlarged diameter of the cylinder bore, and a quantity of oil in the lower part of the cylinder sealing the head of air in the hollow of the piston.

2. In a shock absorber, a cylinder, a relatively long hollow piston mounted for reciprocation within the cylinder, the internal bore of the cylinder fitting the diameter of the piston for a part of its length but leaving a space between the piston and the cylinder around the lower end of the piston, a perforated closure for the lower end of the piston, the diameter of said closure being substantially equal to that of the greatest diameter of the cylinder bore to close said space between the piston and cylinder, a head of air in the hollow of the piston and a quantity of oil in the lower part of the cylinder for sealing said air within the hollow of the piston.

3. In a shock absorber, a cylinder, a relatively long hollow piston mounted for reciprocation within the cylinder, the internal bore of the cylinder fitting the diameter of the piston for a part of its length but leaving a space between the piston and the cylinder around the lower end of the piston, a perforated closure for the lower end of the piston, the diameter of said closure being substantially equal to that of the greatest diameter of the cylinder bore to close said space between the piston and cylinder, a head of air in the hollow of the piston and a quantity of oil in the lower part of the cylinder for sealing said air within the hollow of the piston, and a valved air filling communication on the outside of the cylinder extending through the perforated closure for the lower part of the piston and into the hollow thereof.

ROLAND M. GRUSS.